(12) United States Patent
Kijima

(10) Patent No.: US 6,614,473 B1
(45) Date of Patent: Sep. 2, 2003

(54) IMAGE SENSOR HAVING A MARGIN AREA, LOCATED BETWEEN EFFECTIVE PIXEL AND OPTICAL BLACK AREAS, WHICH DOES NOT CONTRIBUTE TO FINAL IMAGE

(75) Inventor: Takayuki Kijima, Akiruno (JP)

(73) Assignee: Olympus Optical Co., Ltd., Toyko (JP)

( * ) Notice: Subject to any disclaimer, the term of this patent is extended or adjusted under 35 U.S.C. 154(b) by 0 days.

(21) Appl. No.: 09/165,564

(22) Filed: Oct. 2, 1998

(30) Foreign Application Priority Data

Oct. 3, 1997 (JP) .......................................... H9-271579

(51) Int. Cl.[7] .......................... H04N 9/64; H04N 5/217; H04N 7/12
(52) U.S. Cl. ....................... 348/243; 348/241; 348/608; 375/240.25; 375/240.26
(58) Field of Search ................................ 348/243, 245, 348/222, 241, 358, 529, 575, 597, 607, 608, 625, 222.1, 240.25, 240.26; 375/240.26, 240.29, 240.25

(56) References Cited

U.S. PATENT DOCUMENTS

| 5,486,859 A | * | 1/1996 | Matsuda | 348/245 |
|---|---|---|---|---|
| 5,608,455 A | * | 3/1997 | Oda | 348/245 |
| 5,719,624 A | * | 2/1998 | Sasaki et al. | 348/231 |
| 6,011,583 A | * | 1/2000 | Hieda et al. | 348/220 |
| 6,061,092 A | * | 5/2000 | Bakhle et al. | 348/243 |
| 6,072,527 A | * | 6/2000 | Iwai | 348/243 |
| 6,323,900 B1 | * | 11/2001 | Kobayashi | 348/243 |
| 6,426,771 B1 | * | 7/2002 | Kosugi | 348/222.1 |

* cited by examiner

*Primary Examiner*—Wendy R. Garber
*Assistant Examiner*—Lin Ye
(74) *Attorney, Agent, or Firm*—Volpe and Koenig, P.C.

(57) ABSTRACT

Image signals used in a camera from a CCD are sampled-and-held by a CDS circuit, subjected to an A/D conversion, stored in a DRAM, and stored in a recording medium after a compression process of data from an effective area and an optical black area of the CCD by a compressing/decompressing circuit. Image output is regenerating by decompressing the compressed data in the recording medium. A margin area is defined at a boundary area of the effective area and the OB area and the output from the margin area is not used for image data processing, so that noise does not affect the image output. In this camera, high quality image signals can be obtained and a black level can be accurately corrected.

6 Claims, 4 Drawing Sheets

IMAGE SENSOR HAVING A MARGIN AREA, LOCATED BETWEEN EFFECTIVE PIXEL AND OPTICAL BLACK AREAS, WHICH DOES NOT CONTRIBUTE TO FINAL IMAGE

BACKGROUND OF THE INVENTION (1) Field of the Invention

The present invention relates to the processing of output of an effective pixel region and an optical black area of a solid-state image sensor used in a camera.

(2) Description of the Related Art

As shown in FIG. 5, in a conventional photovoltaic surface of a CCD, which is a solid-state image sensor applicable to, for example, a digital camera, there are provided an effective area 50a serving as an effective pixel region in which image signals of pixels (cells) can be read, and an optical black area (OB) 50b in which reference black level signals for correction of the image output signals with regard to the above-mentioned pixels can be read.

Further, output signals from each pixel array of the CCD are sampled-and-held by a correlated double sample-and-hold circuit, subjected to an A/D conversion, temporarily stored in a DRAM, subjected to a compressing process by a compressing/decompressing circuit, and then, stored as image signals in a recording medium such as a memory card.

The compressing process is carried out in such a manner that all the pixel arrays which include the effective area. 50a and the OB area 50b are divided into a predetermined unit block of n (number of pixels) by m (number of pixels), such that output of each pixel is read by the unit block, and subjected to a DCT, and then, Huffman coding processing is conducted. At regeneration, the compressed data in each block is inversely transformed by a decompressing process and image signals are obtained. Incidentally, the compressing process is irreversible, so that the image signals processed by the irreversible compressing process are not exactly the same as the image signals before the compressing process, even if the compressed image signals are decompressed.

With regard to the conventional imaging apparatus described above, the compressing process is conducted in such a manner that the pixel arrays of the CCD are divided into blocks of n by m as described above. However, when all the pixels of the CCD are divided into the blocks, a boundary line L0 between the effective area 50a and the OB area 50b may run through the divided blocks described above like a boundary block 50c, as shown in FIG. 6, owing to the relationship between the number of all the pixels and the number of pixels in divided blocks. When the image signals of the boundary blocks 50c are compressed and regenerated by the decompressing process, the regenerated image of the boundary blocks 50c is not exactly the same as the original image owing to the irreversibility of the compressing process. Therefore, the optical black area affects the effective area, so that the boundary line L0 becomes irregularly fuzzy causing poor quality of the image output.

As shown in FIG. 6, showing an enlarged arrangement of the photovoltaic surface, when all the pixels of the CCD are divided into the blocks 50c, the boundary line L0 may be coincident with a dividing line L1 of the divided blocks. Pixel output signals around the dividing line L1, which lies in the transition area to the optical black area may include noise. When the output signals of the effective area have the noise described above, an imaging signal level in the edge portion of the area may fluctuate, so that the regenerated image has poor quality.

Additionally, in the conventional compressing process, only the effective area is recorded and a black level is determined by a clamping process at the time of recording, so that a stable accuracy of the black level is hardly obtained. Further, it is capable of correcting the black level at the time of recording, but there is a problem that the period of the recording process becomes long.

SUMMARY OF THE INVENTION

The present invention is intended to address the problems described above. An object of the present invention is to provide a camera that uses a solid-state image sensor in which fluctuations at a boundary region between an effective pixel region and an optical black area are removed so as to obtain picture signals with high quality; and further, in which a highly accurate black level can be detected and correction is conducted at regeneration.

A first camera in accordance with the present invention includes: a solid-state image sensor having an optical black area at a predetermined region other than an effective pixel region; a correlated double sample-and-hold circuit provided with the solid-state image sensor for sampling-and-holding pixel output of the solid-state image sensor; and a compressing unit for irreversibly compressing output signals of the correlated double sample-and-hold circuit corresponding to the effective pixel region and the optical black area of the solid-state image sensor, respectively; and wherein the solid-state image sensor has a margin area which is provided at a boundary area between the effective pixel region and the optical black area, and the margin area does not contribute to regeneration of an image.

A second camera in accordance with the present invention includes: a solid-state image sensor having an optical black area at a predetermined region other than an effective pixel region; a correlated double sample-and-hold circuit provided with the solid-state image sensor for sampling-and-holding pixel outputs of the solid-state image sensor; and a compressing unit for irreversibly compressing output signals of the correlated double sample-and-hold circuit corresponding to the effective pixel region and the optical black area of the solid-state image sensor, respectively; and wherein the solid-state image sensor has a margin area which is provided at a boundary area between the effective pixel region and the optical black area, and the margin area does not contribute to regeneration of an image, and the width in the line direction of the optical black area is set to 2 times or more by integer the width of the block area as a processing unit in the irreversible compressing process by the compressing unit.

A third camera in accordance with the present invention includes: a solid-state image sensor having an optical black area at a predetermined region other than an effective pixel region; a correlated double sample-and-hold circuit provided with the solid-state image sensor for sampling-and-holding pixel outputs of the solid-state image sensor; and a compressing unit for irreversibly compressing output signals of the correlated double sample-and-hold circuit corresponding to the effective pixel region and the optical black area of the solid-state image sensor, respectively.

DESCRIPTION OF THE PREFERRED EMBODIMENT

Referring to figures, embodiments in accordance with the present invention are described as follows.

Figure 1:
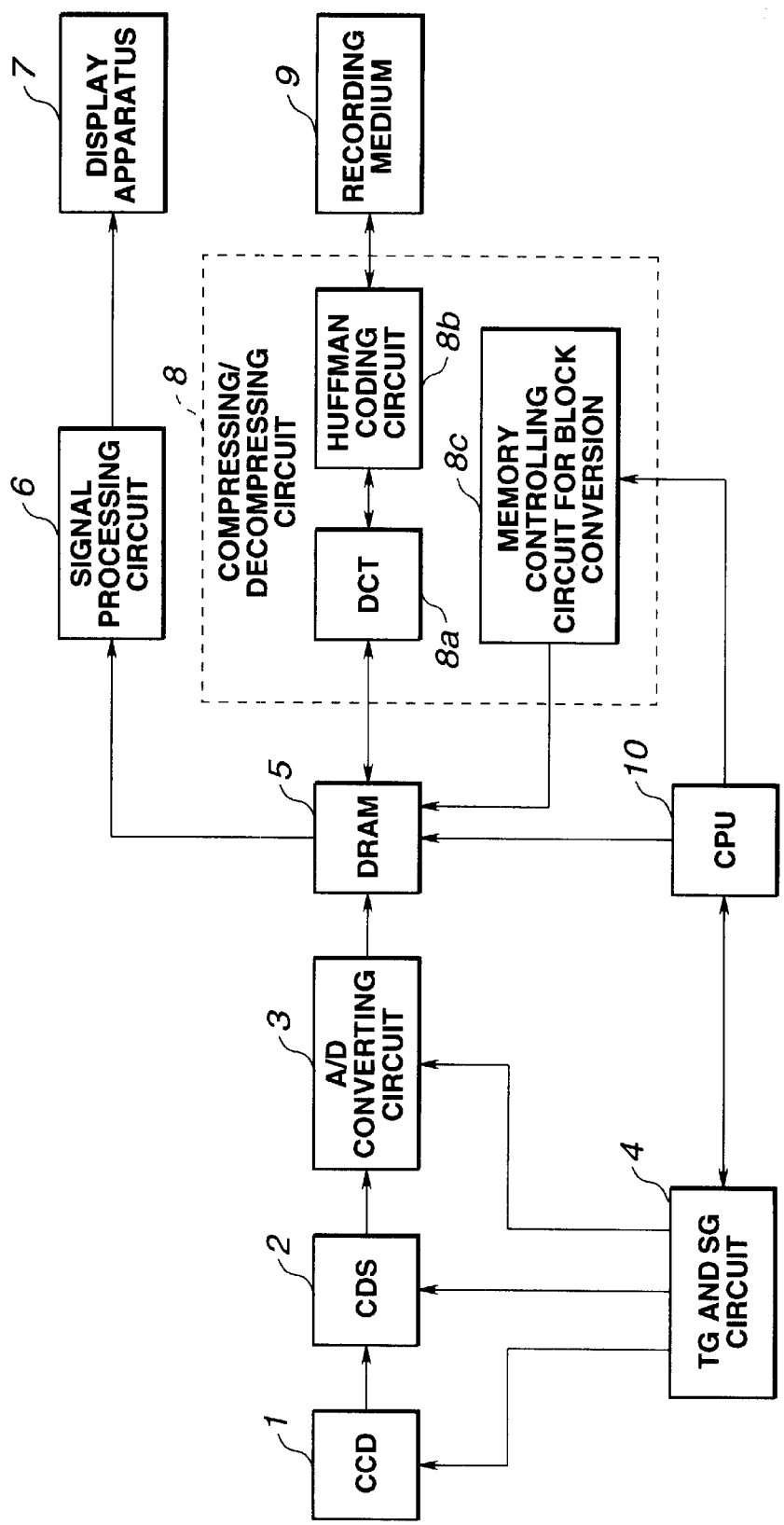
FIG. 1 is a block diagram of a camera according to an embodiment of the present invention.

FIG. 1 is a block diagram of a camera according to an embodiment of the present invention.

This camera comprises a CCD 1 being a solid-state image sensor which converts an image of a subject to electrical signals; a CDS 2 which is a circuit for processing the electrical signals by a correlated double sample-and-hold process; an A/D converting circuit 3 in which output from the CDS 2 is converted to digital signals; a TG (Timing Generator) and an SG (Signal Generator) circuit 4 which outputs a timing signal for driving the CCD, the CDS and the A/D converting circuit described above; a DRAM 5 which stores temporarily the digital signals; a signal processing circuit 6 which reads the signals stored in the DRAM 5 and converts them to analog image signals capable of an LCD display; an LCD display apparatus 7; a compressing/decompressing circuit 8 which reads signals stored in the temporary memory means, e.g. the DRAM 5, and compresses or decompresses irreversibly the signals; a recording medium 9 which is a memory means such as a memory card storing the compressed digital image signals; and a CPU 10 with built-in correcting means for the signal level and globally controlling the present apparatus.

Figure 2:
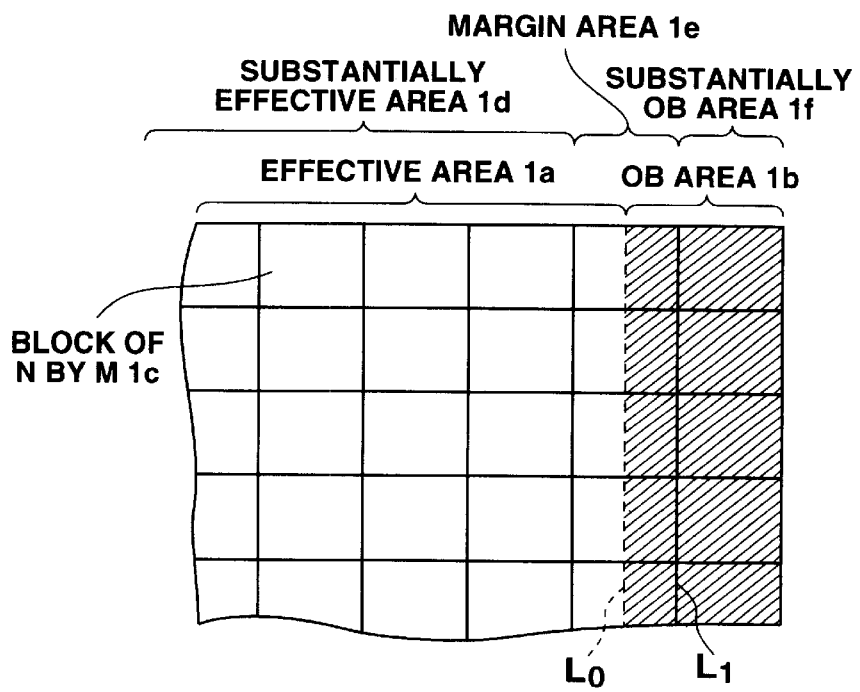
FIG. 2 is an enlarged view showing an arrangement by a unit block of an effective area and an OB area on a photovoltaic surface of a CCD applied to the camera according to FIG. 1, the boundary between the effective area and the OB area running through blocks.

As shown in the enlarged view illustrating the arrangement in FIG. 2, the pixel area on the photovoltaic surface of the CCD 1 described above comprises an effective area 1a, that is, an effective pixel region outputting imaging pixel signals and an optical black (OB) area 1b outputting OB data, that is, reference black level signals. The entire pixel area which consists of the effective area 1a and the optical black (OB) area 1b of the CCD 1 is divided into blocks with a predetermined area, e.g. n (number of pixels) by m (number of pixels) 1c. A compressing process described hereinbellow is conducted in each block 1c.

Inside the compressing/decompressing circuit 8, a DCT circuit 8a, a Huffman coding circuit 8b, and a memory controlling circuit for block-conversion 8c are embedded. When an irreversible compressing process is conducted by the compressing/decompressing circuit 8, initially, values of pixel addresses on the DRAM 5 existing in each block of n by m 1c of the CCD 1 are sequentially specified by the memory controlling circuit for block-conversion 8c. Then, the image data of each block 1c and the OB data is read, subjected to DCT, and stored in the recording medium 9 as compressed data after Huffman coding processing.

On the other hand, when the compressed and stored data is regenerated, the compressed data stored in the recording medium 9 is read and decompressed by the Huffman coding circuit 8b and the DCT circuit 8a. The decompressed and regenerated image data and the regenerated OB data are temporarily stored in addresses corresponding to the effective area 1a and the OB area 1b of the DRAM 5, respectively.

Then, the decompressed image data in the effective area is corrected on the basis of the regenerated OB data which represents a reference black level of the OB area. In this case, with regard to the camera in accordance with this embodiment, a boundary area between the effective area 1a and the OB area 1b is treated as a margin area. The image data on the margin area is not displayed as regenerated image data. The OB data is not used as the data for processing a black level correction.

As shown in FIG. 2, when the boundary line L0 between the effective area and the OB area is not coincident with the dividing line L1 of the blocks of n by m 1c and the boundary line L0 runs through the blocks 1c, an array through which the boundary line L0 runs (one block width in the line direction) is defined as a margin area 1e. Additionally, a substantially effective area 1d is defined as an effective area 1a other than the margin area, and the data in the substantially effective area is treated as image data. Further a substantially OB area 1f is defined as an OB 1b area other than the margin area, and the data in the substantially OB area is treated as data for a reference black level. Pixel output from the effective area and pixel output from the OB area in the margin area are not used for image processing from then on.

Figure 3:
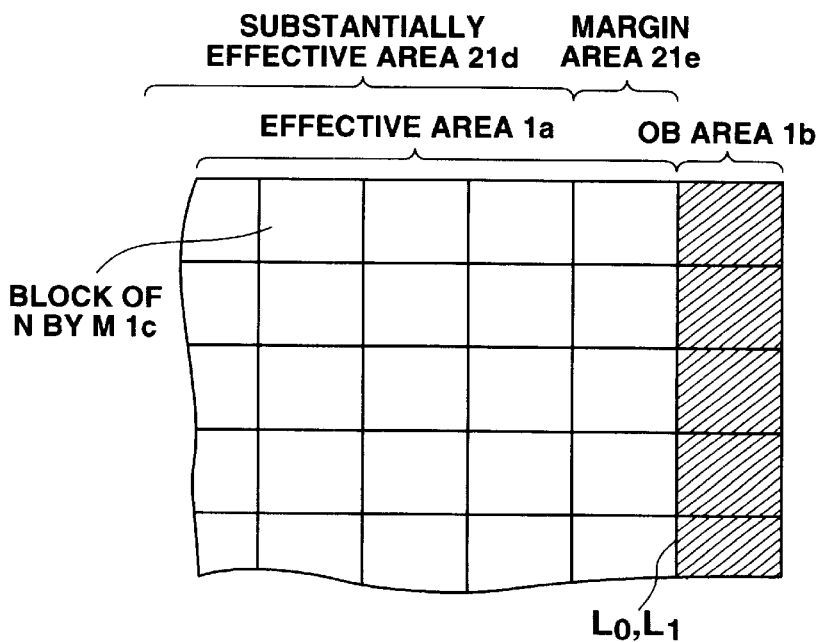
FIG. 3 is an enlarged view showing an arrangement by a unit block of the effective area and the OB area on the photovoltaic surface of the CCD applied to the camera according to FIG. 1, the boundary between the effective area and the OB area being coincident with a dividing line of processing blocks.

As shown in FIG. 3, which shows an enlarged view illustrating the arrangement of the photovoltaic surface, when the boundary line L0 between the effective area and the OB area is coincident with the dividing line L1 of the blocks of n by m 1c, an array of blocks of the effective area 1a with which the boundary line L0 comes into contact (one block width in the line direction) is defined as a margin area 21e. Additionally, a substantially effective area 21d is defined as an effective area 1a other than the margin area, and the data in the substantially effective area is treated as image data. Further, an OB area 1b is defined as a substantially OB area as is, and the data in the OB area is treated as data for a reference black level.

As described above, with regard to the camera in accordance with this embodiment, although the boundary line L0 between the effective area and the OB area is coincident with the dividing line L1 of the blocks of n by m 1c, or the boundary line L0 between the effective area and the OB area is not coincident with the dividing line L1 of the blocks of n by m 1c, a margin area is provided at the boundary area between these areas, and the data in the margin area is not used. Therefore, fluctuation of data which occurs in the boundary area between the effective area 1a and the OB area 1b with regard to a conventional camera is prevented from propagating toward the image output of the effective pixels, and the accurate detection of a black level and the correction can be simultaneously conducted, so that the regenerated image data can has good quality.

In addition, the compressing process in the compressing/decompressing circuit 8 is performed by a unit block in the entire pixel area of the effective area 1a and the OB area 1b including the margin area, and the data in the margin area is processed in the same way. Therefore, blocks can be consecutively specified by using the memory-controlling circuit for block conversion 8c in the DRAM 5 at compression, so that the control can be simplified at a high speed.

Figure 4:
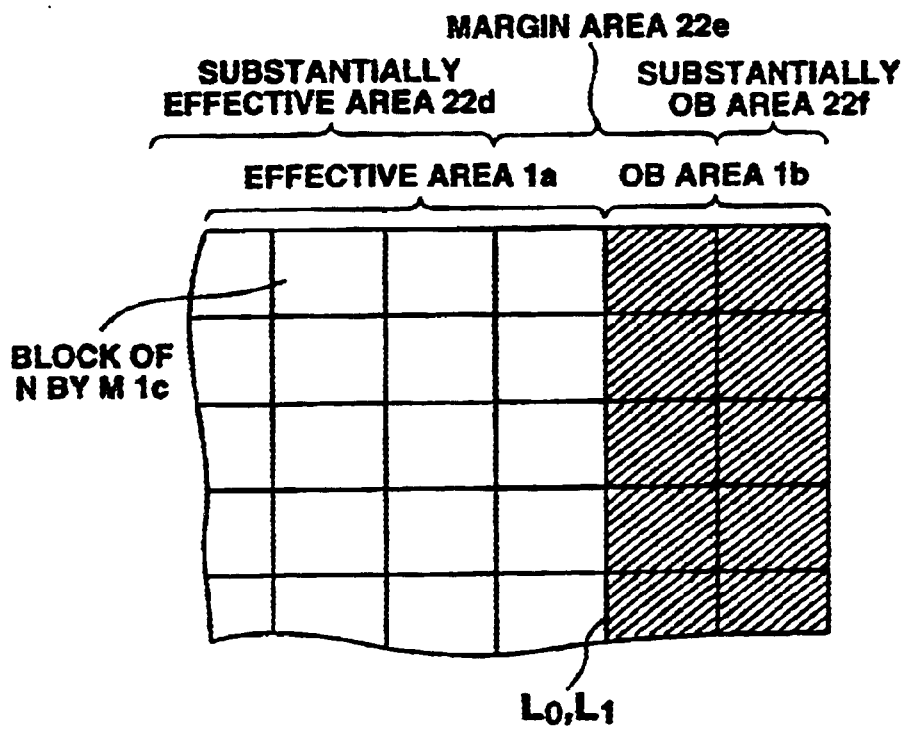
FIG. 4 is an enlarged view showing an arrangement by a unit block of an effective area and an OB area on a photovoltaic surface of a CCD to explain a modified embodiment of the camera shown in FIG. 1.
Figure 5:
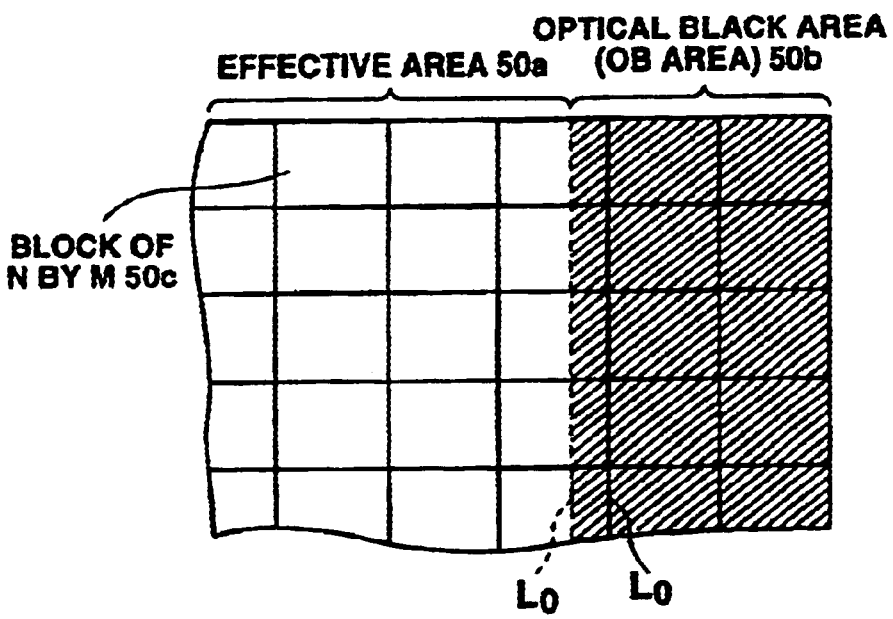
FIG. 5 is an enlarged view showing an arrangement of an effective area and an OB area on a photovoltaic surface of a CCD applied to a conventional camera, a boundary between an effective area and an OB area running through blocks.
Figure 6:
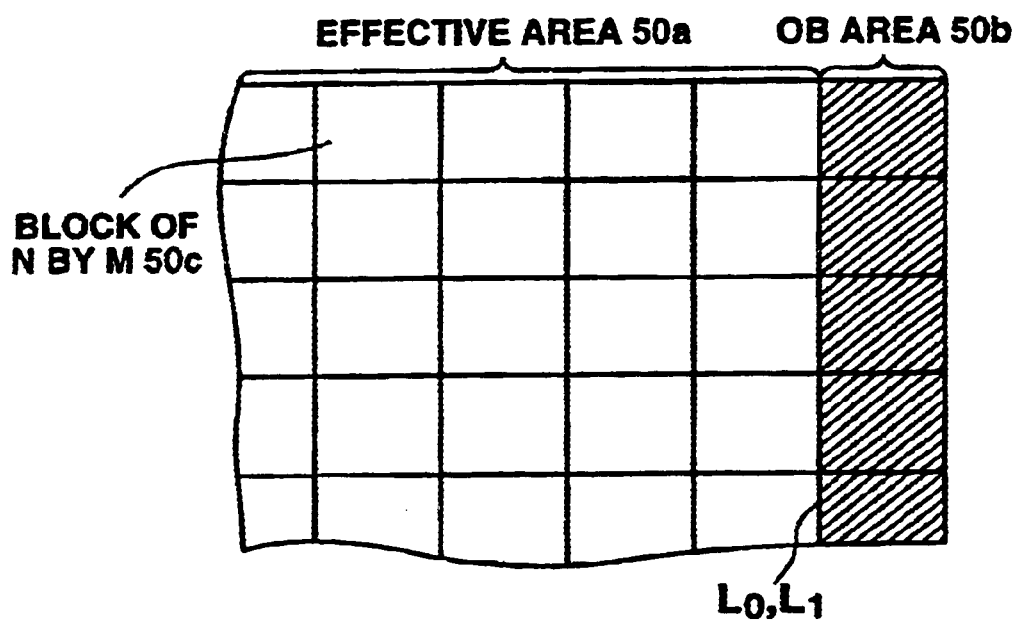
FIG. 6 is an enlarged view showing an arrangement of the effective area and the OB area on the photovoltaic surface of the CCD applied to the conventional camera, the boundary between the effective area and the OB area being coincident with a dividing line of processing blocks.

Next, a modified embodiment of the camera in accordance with the embodiment described above with regard to the way of providing the OB area and the margin area in the CCD 1 is described. In this modified embodiment, as shown in FIG. 4, which shows an enlarged view illustrating the arrangement of the photovoltaic surface, a CCD 1 providing at least 2 arrays of blocks as the OB area 1b (the width of 2 blocks in the scanning direction) is adapted. Then, the blocks of an array of the effective area being placed in contact with the OB area 1b (the width of one block in the scanning direction) and one line of the OB area being placed in contact with the effective area 1a (the width of one block in the scanning direction), that is, 2 arrays of blocks are defined as a margin area 22e in which data cannot be used. The blocks of the effective area 1a other than an array of blocks being placed in contact with the OB area are defined as a substantially effective area 22d. In addition, the blocks of the OB area 1b other than an array of blocks being placed in contact with the effective area are defined as a substantially OB area 22f.

In accordance with the modified embodiment described above, although the unused margin area 22e is provided in the CCD 1, the OB area with at least one array of blocks can be allocated, so that data of a reference black level can be read with reliability. Therefore, although noise occurs in the boundary between the effective area and the OB area, affecting the OB area, the black level can be accurately detected.

Incidentally, the embodiment shown in FIG. 4 is a case in which the boundary line L0 between the effective area and the OB area is coincident with the dividing line L1 of blocks. However, when the boundary line L0 is entered into the effective area, an array of blocks containing the boundary line L0 and an array of blocks of the OB area are defined as a margin area and the remaining OB area is defined as a substantially OB area.

As described above, since the margin area which is not used for image data processing is provided for the camera in accordance with the present invention, the effect of the optical black area is to prevent propagation to the effective pixel output, and an accurate black level in the optical black area can be detected. As a result, a high quality image can be obtained.

Further, because the optical black area which is completely free from the effect of an imaging signal region can be obtained, a black level can be accurately detected. Therefore, a correction for the black level to extract the original imaging signal level is performed, so that high quality images can be obtained.

Furthermore, since the operation is simplified at shooting, the processing period for recording is reduced.

What is claimed is:

1. A camera comprising:
   a solid-state image sensor having an optical black area at a predetermined region other than an effective pixel region and a margin area which is provided at a boundary area between said effective pixel area and said optical black area;
   compressing means for irreversibly compressing signals of said effective pixel region and said optical black area of said solid-state image sensor, respectively, into compressed data;
   means for decompressing said compressed data into a regenerated effective area and a regenerated optical black area; and
   means for correcting said regenerated effective area using said regenerated means for correcting said regenerated optical black area as a reference black level;
   wherein said margin area does not form part of said regenerated effective area or said regenerated optical black area.

2. A camera according to the claim 1, wherein said margin area comprises a set with an integer number of block areas or semi-block areas as a processing unit in said irreversible compressing process by said compressing means.

3. The camera of claim 1, further comprising a correlated double sample-and-hold circuit provided to said sold-state image sensor for sampling-and-holding pixel output of said solid-state image sensor.

4. A camera comprising:
   a solid-state image sensor having an optical black area at a predetermined region other than an effective pixel region; and
   compressing means for irreversibly compressing output of said effective pixel region and said optical black area of said solid-state image sensor, respectively;
   wherein said solid-state image sensor is divided into a plurality of blocks, each of said plurality of blocks having a predetermined area, and has a margin area which is provided at a boundary area between said effective pixel region and said optical black area, said margin area does not contribute to regeneration of an image and a width in a line direction of said optical black area is set to N times width of one of said plurality of blocks in said irreversible compressing process by said compressing means, wherein N is a real integer equal to or greater than two (2).

5. The camera of claim 4, further comprising a correlated double sample-and-hold circuit provided to said sold-state image sensor for sampling-and-holding pixel output of said solid-state image sensor.

6. An electronic still camera comprising:
   a solid-state image sensor having an optical black area at a predetermined region other than an effective pixel region and a variable margin area provided at a boundary area between said effective pixel region and said optical black area;
   block division means for dividing digital image signals from said solid-state image sensor stored in a temporary memory into data blocks of a predetermined size, said block division means setting a size of said variable margin area so as not to be used for effective image data based on coincidence between said predetermined block size and an actual size of said optical black area;
   compressing means for irreversibly compressing signals of data blocks stored in said temporary memory corresponding to both said effective pixel region and said optical black area of said solid-state image sensor into compressed data, respectively;
   recording means for storing said compressed data from said compressing means; and
   decompressing means for restoring image signals stored in said recording means according to size setting information of said variable margin area by said block division means.

* * * * *

UNITED STATES PATENT AND TRADEMARK OFFICE
CERTIFICATE OF CORRECTION

PATENT NO. : 6,614,473 B1  
DATED : September 2, 2003  
INVENTOR(S) : Takayuki Kijima It is certified that error appears in the above-identified patent and that said Letters Patent is hereby corrected as shown below:

<u>Title page,</u>  
Item [57], ABSTRACT,  
Line 6, after the word "is", delete "regenerating" and insert therefor -- regenerated --.

<u>Column 1,</u>  
Line 30, after the word "effective", delete "area. 50a" and insert therefor -- area 50a --.

<u>Column 2,</u>  
Line 25, after the word "pixel", delete "output" and insert therefor -- outputs --.

<u>Column 4,</u>  
Line 65, after the word "data", delete "can".

<u>Column 6,</u>  
Lines 13 and 37, after the word "said", delete "sold-state" and insert therefor -- solid-state --.

Signed and Sealed this

Twenty-second Day of June, 2004

JON W. DUDAS  
*Acting Director of the United States Patent and Trademark Office*